UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

HYDROXYARYLARSENOXID

No. 907,978.     Specification of Letters Patent.     Patented Dec. 29, 1908.

Application filed May 1, 1908. Serial No. 430,388.

To all whom it may concern:

Be it known that we, PAUL EHRLICH, M. D., professor of medicine, and ALFRED BERTHEIM, Ph. D., both citizens of the Empire of Germany, and residing at Frankfort-on-the-Main, Germany, have invented certain new and useful Improvements in Hydroxyarylarsenoxids, of which the following is a specification.

We have found that the hydroxyarylarsenoxids obtainable by reducing hydroxyarylarsinic acids possess valuable properties for pharmaceutical use; they are used for therapeutical disinfecting purposes and as parent material in making the arsenophenols.

The hitherto unknown hydroxyarylarsenoxids are white crystallized compounds, the constitution of which corresponds to the formula:

$$HO-Aryl-As=O$$

They are readily soluble in water, alcohol, acetone and glacial acetic acid, difficultly soluble in benzene, chloroform and carbonbisulfid. Their aqueous solution shows with ferric chlorid a dirty violet color. With alkalies they form salts which are soluble in water.

The hydroxyarylarsenoxids are obtained by the action of weak reducing agents on oxyarylarsinic acids: as for instance para-hydroxyphenylarsinic acid; hydroxytolylarsinic acid

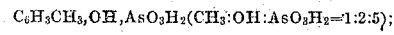

$$C_6H_3CH_3.OH.AsO_3H_2 (CH_3:OH:AsO_3H_2=1:2:5);$$

or hydroxyxylylarsinic acid

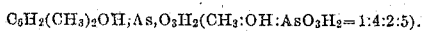

$$C_6H_2(CH_3)_2OH.As.O_3H_2(CH_3:OH:AsO_3H_2=1:4:2:5).$$

The formation of the hydroxyarylarsenoxids from the hydroxyarylarsinic acids corresponds to the equation:

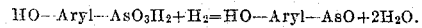

$$HO-Aryl-AsO_3H_2+H_2=HO-Aryl-AsO+2H_2O.$$

By the action of hydrosulfite or sodium amalgam the hydroxyarylarsenoxids turn into yellow-brown arsenophenols which form yellow colored alkali salts. For instance, the preparation of the para-hydroxyphenylarsenoxid is carried out as follows: 114 parts of parahydroxyphenylarsinic acid, which can be produced by decomposing the diazotized para-amidophenylarsinic acids, are dissolved in 14 times their quantity of water. To this solution 20 parts by weight of iodid of potassium and 600 parts by weight of 20% sulfuric acid are added, and then it is saturated at ordinary temperature with sulfurous acid. After having allowed the solution to stand for a little while, it is saturated with sodium chlorid, and extracted by means of ether. The ethereal extract is shaken with saturated solution of soda and after separating the solution the ether is distilled off. Thereupon the phenolarsenoxid remains in the form of a white crystalline substance the properties of which are those given in the above general description of hydroxyarylarsenoxids; it can, without becoming decomposed, be heated up to 240° C. If neutral sodium hydrosulfite be added to the aqueous solution of hydroxyphenylarsenoxid and gently heated on the water-bath, arsenophenol separates in the form of yellow-brown flakes.

Having now described our invention, what we claim is:

1. As new products, the hydroxyarylarsenoxids, the constitution of which corresponds to the formula:

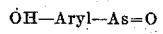

$$OH-Aryl-As=O$$

being white crystalline bodies, which are readily soluble in water, alcohol, ether and glacial acetic acid, and difficultly soluble in benzene, chloroform and carbon bisulfid, their aqueous solution when treated with ferric chlorid assuming a dirty violet color, said products reacting with alkalies to form salts which are soluble in water and their aqueous solution when treated with neutral sodium hydrosulfite and heated yielding arsenophenols of a reddish-brown color.

2. As a new product, the para-hydroxyphenylarsenoxid of the constitution:

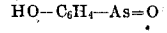

$$HO-C_6H_4-As=O$$

being a white crystalline compound which is readily soluble in water, alcohol, ether and glacial acetic acid, and difficultly soluble in benzene, chloroform and carbon bisulfid, the aqueous solution of which with ferric chlorid assumes a dirty violet color, and which with alkalies form salts which are soluble in water and said compound in neutral solution being transformed by hydrosulfite into arsenophenol of a yellow-brown color.

In testimony, that we claim the foregoing as our invention, have signed our names in presence of two subscribing witnesses.

PAUL EHRLICH.
ALFRED BERTHEIM.

Witnesses:
JEAN GRUND,
CARL GRUND.